Figure 1:
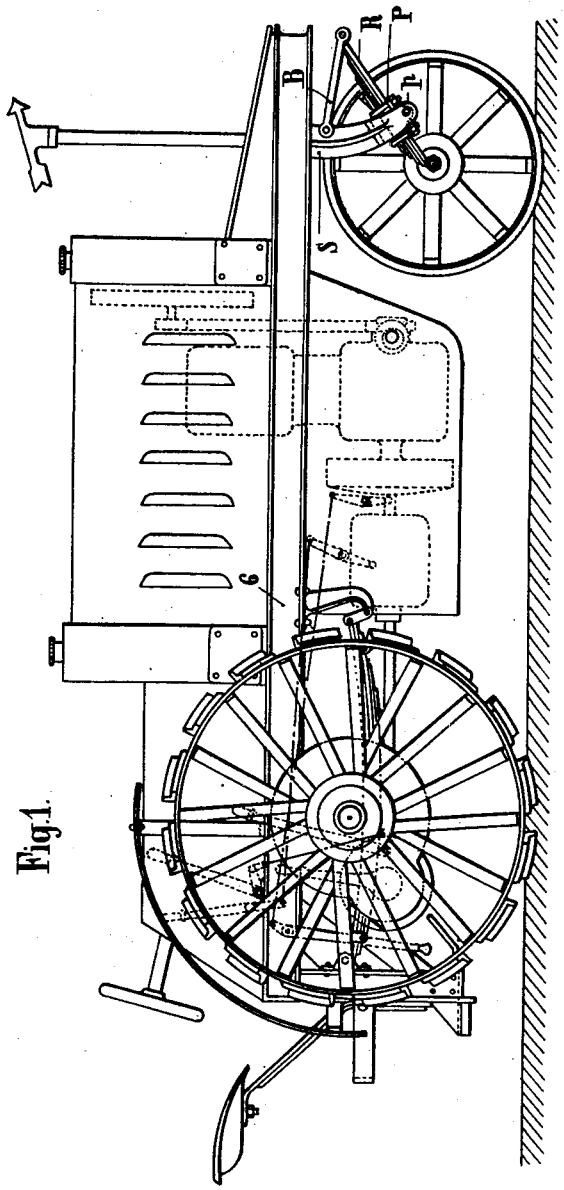

B. A. J. CHAPRON.
AGRICULTURAL TRACTOR.
APPLICATION FILED JULY 25, 1918.

1,351,942.

Patented Sept. 7, 1920.
3 SHEETS—SHEET 1.

INVENTOR
Baptiste A. J. Chapron
BY
ATTORNEY

B. A. J. CHAPRON.
AGRICULTURAL TRACTOR.
APPLICATION FILED JULY 25, 1918.

1,351,942.

Patented Sept. 7, 1920.
3 SHEETS—SHEET 2.

INVENTOR
Baptiste A. J. Chapron
BY
ATTORNEY

B. A. J. CHAPRON.
AGRICULTURAL TRACTOR.
APPLICATION FILED JULY 25, 1918.

1,351,942.

Patented Sept. 7, 1920.
3 SHEETS—SHEET 3.

INVENTOR
Baptiste A. J. Chapron
BY
[signature]
ATTORNEY

UNITED STATES PATENT OFFICE.

BAPTISTE ALFRED JOSEPH CHAPRON, OF PUTEAUX, FRANCE.

AGRICULTURAL TRACTOR.

1,351,942.  Specification of Letters Patent.  Patented Sept. 7, 1920.

Application filed July 25, 1918. Serial No. 246,726.

*To all whom it may concern:*

Be it known that I, BAPTISTE ALFRED JOSEPH CHAPRON, citizen of the Republic of France, and resident of Puteaux, France, (post-office address 45 Rue de la République,) have invented a new and useful Agricultural Tractor, which improvements are fully set forth in the following specification.

This invention relates to an agricultural tractor characterized by a device which makes it possible to lock the differential on its two shafts or to render one or the other of these two shafts the only driving one, and by a device enabling the brakes to be applied to each of the driving wheels separately or together, through the intermediary of a device balancing the action of the brakes.

The pinions of the differential, as well as the hubs of the differential casing are provided with notches by means of which they can be brought into engagement with grooved sleeves sliding on the shafts of the differential which transmit movement to the driving wheels. The sleeves can be brought into engagement either only with the pinions of the differential, or simultaneously with the pinions and the casing, or disengaged from both. These sleeves slide on the shafts of the differential and transmit to them the movement of the pinions or of the casing of the differential.

If it is desired to drive both driving wheels, with balanced effort, the two sleeves are brought into engagement with the pinions of the differential; if it is desired to drive both driving wheels without a balanced effort, the action of the differential is done away with by coupling the sleeves direct to the casing of the differential which itself is secured to the beveled driving gear. If it is desired to drive a single driving wheel, the sleeve which transmits movement to it, is coupled direct to the casing of the differential, and the other sleeve which drives the other driving wheel, is uncoupled so that the latter is not driven.

Each reducing pinion which engages with the toothed rim secured to the driving wheel, is provided with its brake band which is provided with shoes.

These two brakes can be applied separately by means of two hand levers placed one on each brake, or by a third lever which acts on the first two by means of a pivoted bar or some other balancing device enabling the brake to be applied to both wheels with a uniform force.

Figure 3:
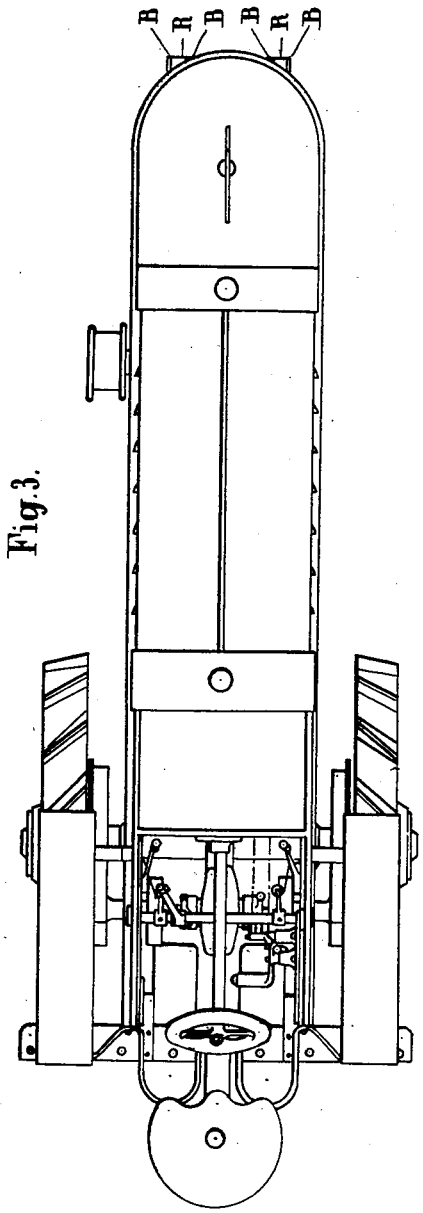
Figure 11:
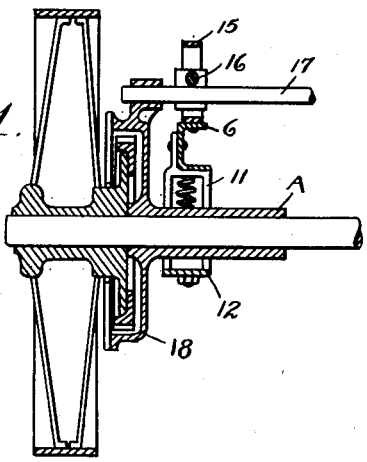
Figure 2:
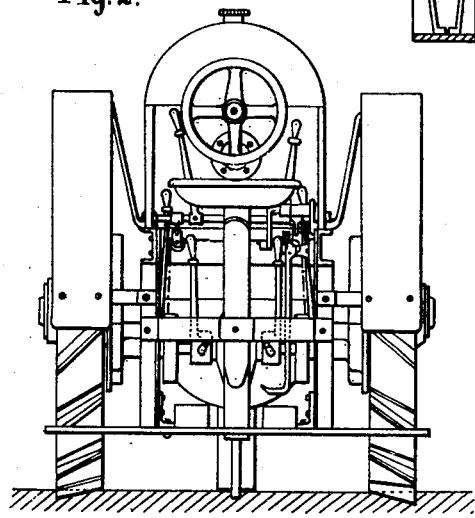
Figure 10:
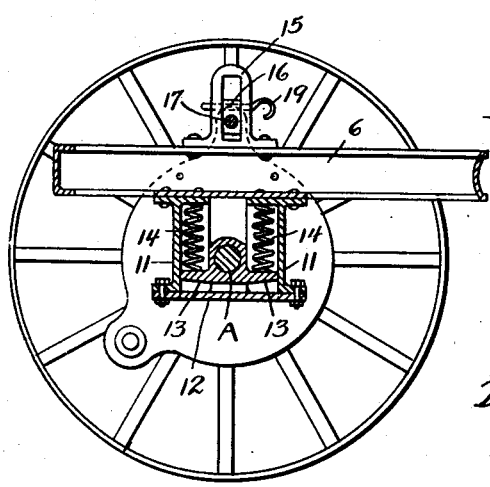
Figure 4:
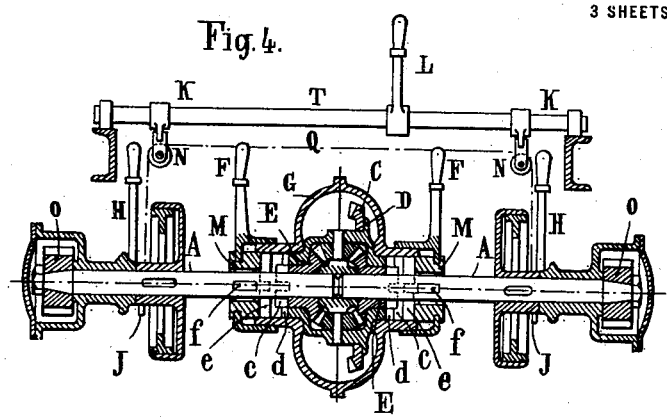
Figure 5:
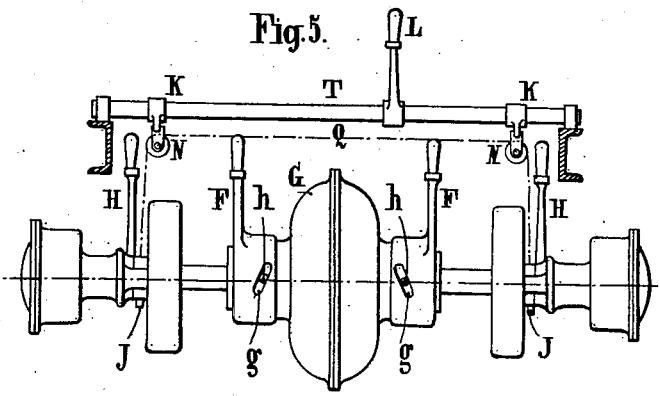
Figure 6:
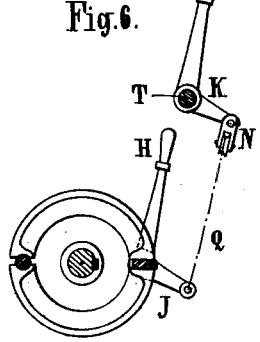
Figure 7:
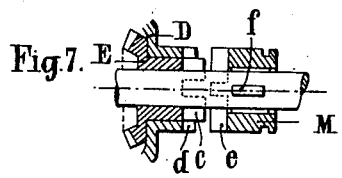
Figure 8:
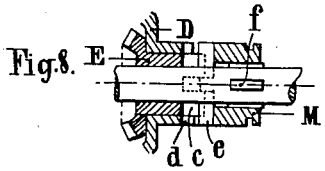
Figure 9:
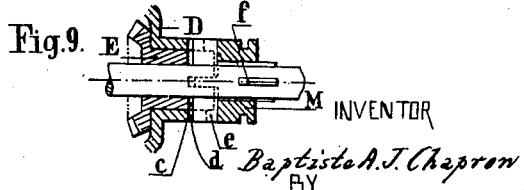

In the accompanying drawings,
Figure 1 is a side elevation of the tractor,
Fig. 2 a back view,
Fig. 3 a plan,
Fig. 4 a section through the differential, the brakes and the driving pinions of the driving wheels,
Fig. 5 an outside view of the outer casing of the differential, of the brakes and of the gear cases inclosing the pinions controlling the driving wheels,
Fig. 6 is a cross-section through the brakes,
Figs. 7-9 show the three positions of the coupling or clutch sleeves,
Figs. 10 and 11 relate to the suspension device for the driving axle.

The suspension of the steering wheel is shown in Figs. 1 and 3. The springs R are provided with a shackle P which is secured to the springs and which is pivoted at its ends at $p$ in the ends of the arms of the steering fork S. At the bottom ends of the springs is secured the spindle of the steering wheel, and the upper ends are connected to the fork by means of rods B. The two arms of the springs can be of a different ratio, and the pivot point can be located closer to or farther from the axis of the wheel.

The working of the differential and of the coupling of the shafts of the differential will be clear from Figs. 4-9. The bevel gear C is secured to the inner casing D of the differential which carries at its ends notches $d$ which can be brought into engagement with the claws $e$ of the sleeves M. The differential pinions E are provided with notches $c$ with which can be brought into engagement the said claws $e$ of the sleeves M. The sleeves M slide on the shafts A of the differential which are provided with keys $f$ by means of which they are driven by the sleeves M. The pinions O for driving the driving wheel rims, are keyed to the shafts A of the differential. The movement of the sleeves M is brought about by means of sleeve-levers F. The sleeve-levers F have helical grooves which slide on fingers $h$ secured to the outer casing G of the differential.

The movement of the levers F produces an axial movement of the sleeves M and therefore a rotary movement of the shafts A with the differential pinions E, a direct movement with the casing D of the differential or a disengagement. The notches $c$ and $d$ correspond, so that the claws $e$ can engage simultaneously with the notches $c$ and $d$. The notches $c$ of the differential pinions E are longer than the notches $d$ of the casing D of the differential.

When the sleeves M are in their extreme position as shown in Fig. 7, there is a disengagement, and the corresponding driving wheels are not driven.

When the two sleeves M on the right and on the left are in the position shown in Fig. 8, the notches $c$ of the differential pinions E are in engagement with the claws $e$ of the sleeves. The movement is transmitted by the differential, and the two driving wheels are driven by balanced forces.

When the two sleeves are brought into the other extreme position as shown in Fig. 9, both the notches $c$ of the differential pinions E and the notches $d$ of the differential casing D are in engagement with the claws of the sleeves M, and there is then a direct driving between the bevel gear C which is secured to the casing D of the differential, and the two shafts A of the differential. The differential is locked, and the two driving wheels receive a uniform motion with a non-balanced effort. The same driving takes place if one of the two sleeves M is in the position of Fig. 8, and the other in the position of Fig. 9. In this case, the movement imparted to the sleeve in the Fig. 8 position, is transmitted by the pinions of the differential which engage at the other side with the notches $c$ and $d$ and the claw $e$ of the second sleeve M which is in the position shown in Fig. 9. When one of the two sleeves M is in the position shown in Fig. 7, and the other in the position shown in Fig. 9, there will be driving only by one of the two driving wheels, and the other one will not be driven. It is the case met with in sharp turning or when traction is done in the plane of one driving wheel.

Combined control of the brakes is obtained as shown in Figs. 5 and 6. Each brake is controlled separately by a hand-lever H keyed direct on the jamming shaft. To the lever arms H are secured levers J which are pulled by a cord Q.

The cord Q passes over grooved pulleys N from the right hand arm J to the left hand arm J.

The pulleys N are pivoted to the ends of two levers K which are both secured to the spindle T. The spindle T is controlled by a hand-lever L secured to it. The ends of the spindle T are supported on the chassis of the tractor. When the hand-lever L is operated, it moves also the levers K, the spindle T and the pivoted pulleys N. The cord Q passing over the pulleys N, is tightened and exercises its balanced action on the two arms J and consequently on the two brakes.

The apparatus can be completed as indicated in Figs. 10 and 11 by a device for the suspension of the driving axle by means of helical springs placed in guide boxes at the side of the axle and under the chassis, and by guides placed above the chassis; a device combined with the upper guides, enables the axle to be locked.

The driving axle A is guided and held at each end by two semi-tubular guides 11 rigidly secured to the chassis 6. In order to strengthen the whole still more, the two guides 11 are connected at their bottom ends by a detachable plate 12.

The axle A is provided at each end with shoes 13 which slide with play in the semi-tubular guides 11.

On the shoes 13 rest the helical suspension springs 14, which are secured to and support the longitudinal members of the chassis.

In order to insure that the driving axle should always remain parallel to itself in the vertical plane, brackets 15 with slots are secured at each end above to the chassis 6. These brackets are provided with slide blocks 16 through which passes a bar 17 secured at its ends to the gear cases 18 of the rims on the wheels, which are secured to the body of the axle A.

In this way the axle A can move in a vertical plane, being guided at the bottom by the guides 11 and at the top by the slotted brackets 15.

A cotter-pin 19 can be introduced through holes provided in each of the brackets 15 and the corresponding slide block 16, whereby the axle A is locked relatively to the chassis 6.

I claim as my invention:

1. In a motor-driven vehicle, the combination of a differential shaft or axle comprising a pair of shaft sections arranged end to end; a differential mounted on said axle and comprising a fixed outer casing, a rotatable inner casing, a driving gear encircling the inner casing and fixed to it, and a set of differential pinions arranged in pairs within the inner casing, one of said pairs of pinions being loosely mounted upon the inner ends of the shaft sections and having their hubs formed with notches and the other pair being fixed to said inner casing to rotate therewith, the ends of the inner casing terminating short of the notched ends of said pair of pinions and being formed with notches which register with said pinion notches; a pair of slidable sleeves keyed to said shaft sections and extending into the ends of the outer casing, said sleeves having toothed inner ends for engagement alternatively with the pinion notches alone or with both the pinion and inner casing notches; and individual operating means for said sleeves.

2. In a motor-driven vehicle, the combination of a differential shaft or axle comprising a pair of shaft sections arranged end to end; a differential mounted on said axle and including a set of differential pinions arranged in pairs, one pair being loosely mounted on the inner ends of the shaft sections, and a rotatable casing encircling said set of pinions and to which the other pair is fixed; a pair of sleeves on said shaft sections for coupling either or both pinions of the first-named pair to the axle, or either or both of said pinions and said casing to said axle; a pair of driving pinions on said shaft sections; a brake associated with each driving pinion; and means for alternatively operating said brakes individually or simultaneously.

3. In a motor-driven vehicle, the combination of a differential shaft or axle comprising a pair of shaft sections arranged end to end; a differential mounted on said axle and including a set of differential pinions arranged in pairs, one pair being loosely mounted on the inner ends of the shaft sections, and a rotatable casing encircling said set of pinions and to which the other pair is fixed; a pair of sleeves on said shaft sections for coupling either or both pinions of the first-named pair to the axle, or either or both of said pinions and said casing to said axle; a pair of driving pinions on said shaft sections; a brake associated with each driving pinion; an individual operating lever for each brake; and a device connected with both operating levers for actuating them simultaneously.

4. In a motor-driven vehicle, the combination of a differential shaft or axle comprising a pair of shaft sections arranged end to end; a differential mounted on said axle; a pair of driving pinions on said shaft sections; a brake associated with each driving pinion; an individual operating lever for each brake provided with an arm; a shaft disposed parallel with said axle; connections between said shaft and both of said arms for operating both brake levers simultaneously when said shaft is rocked; and a lever connected to rock said shaft.

5. In a motor-driven vehicle, the combination of a differential shaft or axle comprising a pair of shaft sections arranged end to end; a differential mounted on said axle; a pair of driving pinions on said shaft sections; a brake associated with each driving pinion; an individual operating lever for each brake provided with an arm; a shaft disposed parallel with said axle; a pair of pulleys carried by said shaft in line with said arms; a flexible element passing over said pulleys and connected at its ends to said arms so as to operate both brake levers simultaneously when said shaft is rocked; and a lever connected to rock said shaft.

In testimony whereof I have signed this specification in the presence of two subscribing witnesses.

BAPTISTE ALFRED JOSEPH CHAPRON.

Witnesses:
JOHN F. SIMONS,
GEORGE LOUD.